(12) United States Patent
Groendal (10) Patent No.: US 9,708,026 B2
(45) Date of Patent: Jul. 18, 2017

(54) BICYCLE FRAME WITH REMOVABLE DOWN TUBE CLIPS

(71) Applicant: Mark L. Groendal, Wyoming, MI (US)

(72) Inventor: Mark L. Groendal, Wyoming, MI (US)

(73) Assignee: Alter Cycles, Ltd., Wyoming, MI (US)

( * ) Notice: Subject to any disclaimer, the term of this patent is extended or adjusted under 35 U.S.C. 154(b) by 54 days.

(21) Appl. No.: 14/778,486

(22) PCT Filed: Mar. 18, 2014

(86) PCT No.: PCT/US2014/031068
§ 371 (c)(1),
(2) Date: Sep. 18, 2015

(87) PCT Pub. No.: WO2014/153351
PCT Pub. Date: Sep. 25, 2014

(65) Prior Publication Data
US 2016/0288861 A1 Oct. 6, 2016

Related U.S. Application Data

(60) Provisional application No. 61/802,840, filed on Mar. 18, 2013.

(51) Int. Cl.
*B62K 3/04* (2006.01)
*B62K 19/18* (2006.01)
(Continued)

(52) U.S. Cl.
CPC ............... *B62K 19/34* (2013.01); *B62K 3/02* (2013.01); *B62K 19/18* (2013.01)

(58) Field of Classification Search
CPC . B62K 3/02; B62K 3/04; B62K 13/02; B62K 15/00; B62K 19/00; B62K 25/04;
(Continued)

(56) References Cited

U.S. PATENT DOCUMENTS 640,680 A * 1/1900 Merrow ................. B62M 17/00
280/260
2,440,091 A * 4/1948 Hoyt ....................... B62K 15/00
280/287

(Continued)

FOREIGN PATENT DOCUMENTS

FR 850970 * 12/1939
WO WO2010/151897 * 12/2010

*Primary Examiner* — Anne Marie Boehler
(74) *Attorney, Agent, or Firm* — Oppenhuizen Law PLC; David L. Oppenhuizen (57) ABSTRACT

A bicycle frame having a replaceable flexible down tube assembly, wherein the down tube assembly includes a resilient arcuate down tube member with connectors in the form of releasable mounting clips removably attached to the ends of down tube member. The clips clamp on transverse mounting pins in stems attached to the bicycle frame at the ends of the down tube assembly. The clips are releasable to remove the down tube assembly from the frame for replacement or substitution of a down tube having different performance or appearance characteristics. The clips are removable from the down tube for separate replacement of clips and the down tube.

8 Claims, 7 Drawing Sheets

(51) Int. Cl.
*B62K 19/34* (2006.01)
*B62K 3/02* (2006.01)

(58) Field of Classification Search
CPC ........ B62K 25/28; B62K 25/30; B62K 13/08;
B62K 2015/001; B62K 2201/00; B62K
2201/06; B62K 19/16; B62K 13/00;
B62K 13/04; B62K 19/18; B62K 2700/32
USPC .................................. 280/278, 287, 283, 275
See application file for complete search history.

(56) References Cited

U.S. PATENT DOCUMENTS

| | | | |
|---|---|---|---|
| 3,876,231 A * | 4/1975 | Geisel .................. | B62K 15/008 280/278 |
| 4,582,335 A | 4/1986 | Paioli et al. | |
| 5,238,259 A | 8/1993 | Wilson et al. | |
| 5,346,237 A * | 9/1994 | Wang ..................... | B62K 19/16 280/281.1 |
| 5,356,165 A | 10/1994 | Kulhawik et al. | |
| 6,659,487 B1 | 12/2003 | Raco | |
| 6,929,277 B2 | 8/2005 | Chao | |
| 8,382,134 B2 | 2/2013 | Bartlett et al. | |
| 2011/0194889 A1 | 8/2011 | Allred et al. | |
| 2012/0098233 A1 | 4/2012 | Groendal | |

\* cited by examiner

BICYCLE FRAME WITH REMOVABLE DOWN TUBE CLIPS

CROSS REFERENCE TO RELATED APPLICATION

This application is a National Stage of International Application No. PCT/US2014/031068, filed Mar. 18, 2014, which claims the benefit of U.S. Provisional Application No. 61/802,840 filed Mar. 18, 2013, the entire disclosure of which is incorporated herein by reference for all purposes.

BACKGROUND OF THE INVENTION

The invention is related to a bicycle frame, in particular to a bicycle frame having a removable down tube, the down tube having removable clips on both ends for easy attachment to and removal from a frame and for separate replacement of the down tubes and clips.

A bicycle frame having a removable down tube was previously disclosed in Applicant's Co-pending U.S. patent application Ser. No. 13/380,726, filed Jun. 28, 2010 the entire disclosure of which is incorporated by reference herein. As discussed in that application, there are several advantages to a bicycle having a flexible down tube that can be removed and replaced with a down tube having different characteristics. The replacement of the down tube allows for the modification of the flex characteristics of the frame as well as physical characteristics, such as head tube and seat tube angle, wheel base, and bottom bracket height.

Another advantage of being able to replace a down tube is related to aesthetic appeal. Riders may desire the ability to change out an existing down tube for a down tube having a different style, color, or pattern. It would be expensive and often impractical to purchase a whole new frame just to get a tube with a different look. The ability to change out just the down tube makes a significant change in the appearance of the frame more affordable.

There have, however, been some difficulties associated with previous designs. The set-ups used for previous removable down tubes have, at times, made it somewhat difficult for riders to change out down tubes quickly and easily. What is needed is an improved construction and method for mounting a removable down tube that facilitates replacement of the down tube while maintaining the secureness of the down tube connection and preserving the flex characteristic of the down tube.

Another object of the present invention is to provide a down tube with easily replaceable end fittings or clips in the ends of the down tube such that end fittings and down tubes can easily be replaced separately, without the expense of replacement of both components at the same time. These and other objects are achieved with the improved frame construction of the present invention.

BRIEF SUMMARY OF THE INVENTION

In accordance with the present invention, a bicycle frame employs a replaceable down tube assembly that is releasably mounted between forward and rearward mounting stems secured to the frame. The mounting stems include transverse mounting pins secured to the frame at positions where ends of the down tube assembly are attached to the frame. The down tube comprises an elongated down tube member having end fittings releasably attached to ends of the down tube member. The end fittings have transverse recesses in outer ends thereof that fit over the mounting pins in the stems. The end fittings permit at least limited pivotal movement of the down tube about the lateral axis of the mounting pins upon at least limited vertical deflection of the down tube in the frame.

In one aspect of the invention, the down tube member comprises an elongated tube having a resilient arcuate portion. The end fittings are mounted on the ends of the tube and provide connector clips for releasably mounting the tube on the mounting pins in the stem.

Desirably, the end fittings are formed from a synthetic resin having sufficient lubricity to permit pivotal movement of the end fittings on the pivot pins without requiring lubrication of the interface between the pivot pins and end fittings.

In one aspect of the invention, at least one end fitting comprises an elongated body having an inner end that fits in the end of the tube and an outer end that protrudes outwardly from the end of the tube, the inner end being releasably attached to the end of the tube by releasable fasteners that extend through the side of the tube and into the inner end of the end fitting, the fasteners being releasable to permit replacement of the end fitting.

In one aspect of the invention, the outer end of the end fitting includes an outwardly extending upper flange, with the upper flange having the transverse slot formed in an underside thereof. The locking mechanism comprises a locking plate that mounts on the underside of the upper flange below the mounting pin when the down tube is mounted in the frame. The locking plate is releasably attached to the upper flange by releasable fasteners that hold the locking plate to the upper flange.

Preferably, the transverse slot has one or more inwardly extending projections at the outer edges of the transverse slot. The inwardly extending projections narrow the width of the slots at the outer edges to a distance less than the diameter of the mounting pins, so that the projections resiliently hold the mounting pins in the slots but are resiliently deflectable to permit the down tubes to be resiliently clipped on the locking pins in the mounts.

Preferably, the down tube employed in the present invention has elongated, arcuate tubes that are at least partially oval, with the down tube having a major oval axis in a horizontal direction when the down tube is mounted.

In another aspect of the invention the transverse mounting pins are removable from the clip members. In such a case, the clip members can, if desired, employ a one piece clip having a transverse bore therethrough. The clips can then be mounted on the stem by aligning the transverse bore in the clip with the mounting pin openings in the stem and inserting the removable pin therethrough.

These and other features and advantages of the present invention will become apparent from the detailed description of the invention set forth below and shown in the appended drawings.

DETAILED DESCRIPTION OF THE INVENTION

Figure 1:
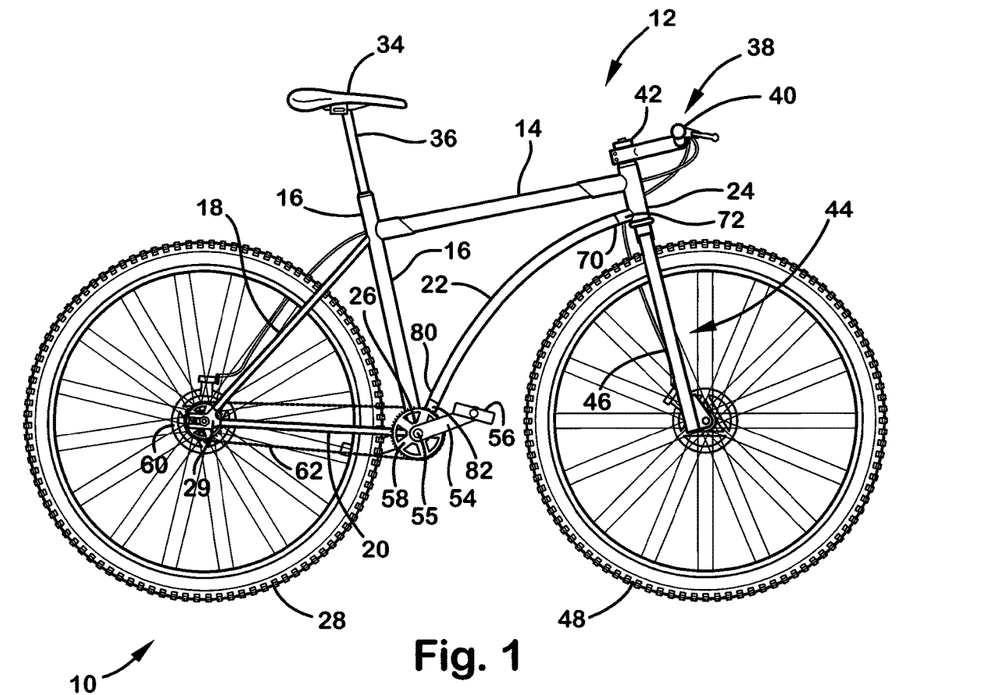
FIG. 1 is a side view of a bicycle having a frame employing the down tube of the present invention.
Figure 2:
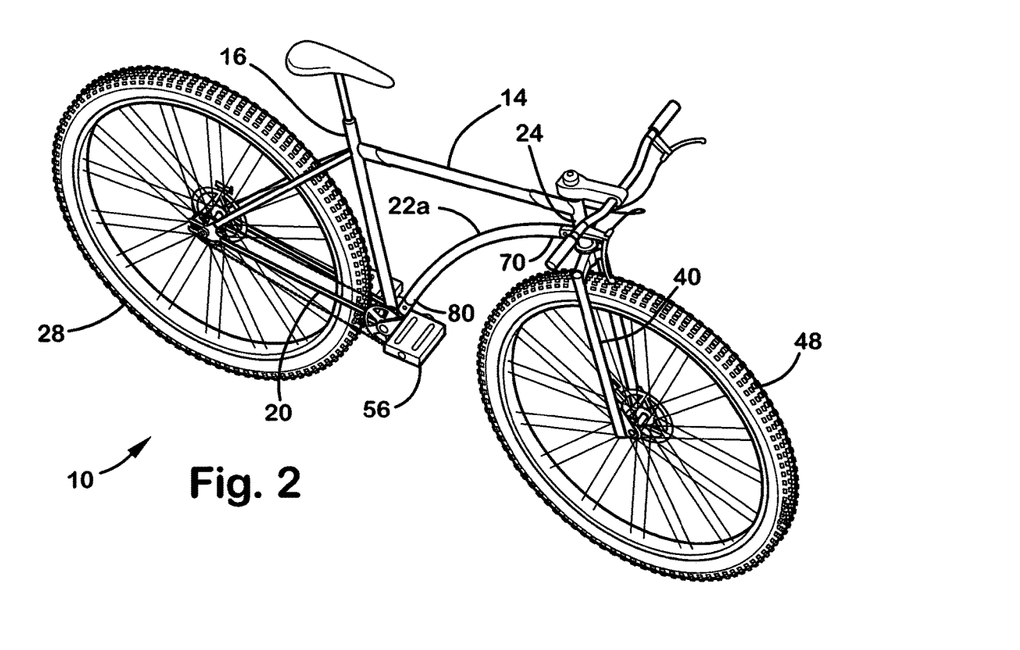
FIG. 2 is a perspective view of the frame of FIG. 1 showing the lower end of the down tube disconnected from that frame.

Referring to the drawings, a first embodiment of bicycle 10 employing a flexible frame 12 in accordance with the present invention is shown in FIG. 1. Bicycle 10 is illustrated as a mountain bike. However, the invention can be used for road bikes, BMX bikes, trail bikes, time trial bikes, city bikes, casual use bikes, and other styles of bike.

Bicycle frame 12 shown in FIG. 1 comprises a top tube 14, a seat tube 16, a seat stay 18, a chain stay 20, a down tube 22, a head tube 24, and a bottom bracket shell 26. The frame includes two chain stays 20 and two seat stays 18, on opposite sides of rear wheel 28, with the rear ends of seat stays 18 and chain stays 20 being connected to a rear drop out 29 that engages the axle 30 on rear wheel 28. The frame and the seat stay and chain stay members 18 and 20 may be formed of aluminum or other metal or carbon fiber material or other conventional materials. A seat 34 mounted on a seat post 36 is mounted to the upper end of seat tube 16, with seat post 36 fitting downwardly inside the hollow upper end of seat tube 16.

A handlebar assembly 38, comprising handlebar 40 and handlebar mount 42, mounts on the upper end of head tube 24, with mount 42 being rotatably mounted on bearings in an open upper end of head tube 24. A fork assembly 44 comprises a pair of spaced forks 46 on each side of front wheel 48, with a conventional fork steerer tube (not shown) extending upwardly into the interior of head tube 24, where it operably engages with the handlebar mount 42.

The bicycle 10 is powered by a conventional pedal mechanism attached to the bottom bracket shell 26 at the bottom of the seat tube 16. A bottom bracket spindle 55 mounted on bearings inside the bottom bracket shell 26 extends outwardly from the sides of the bottom bracket shell and engages a conventional crank set comprising crank arms 54 mounted at the ends of the bottom bracket spindle 55 and having pedals 56 mounted on the outer ends. A chain ring or sprocket 58 is mounted on the spindle for rotation with the pedals. A rear sprocket 60 drivingly engaged to rear wheel 28 is driven by a chain 62 by chain ring or front sprocket 58 in a conventional manner.

As shown in FIG. 1, bicycle 10 employs a flexible arcuate down tube 22, which is preferably similar in shape and flex characteristics to the down tubes described in detail in Applicant's Co-pending U.S. patent application Ser. No. 13/380,726, which is incorporated by reference. An arcuate hollow tubular down tube is described, but an arcuate solid leaf spring could be employed. Either can be regarded as a down tube (i.e. the component extending from the head tube to the bottom bracket shell). In this embodiment, the down tube 22 has replaceable connectors or mounting clips at the ends and is connected at a front end 70 to rear-facing stem 72 which is mounted on head tube 24. At its rear end 80, the down tube 22 is connected to forward-facing stem 82. The forward facing stem 82 is mounted to the bottom bracket shell 26, at or near the base of the seat tube 16. In the alternative, it is also contemplated that the forward-facing stem 82 could be welded to the seat tube 16 near the bottom bracket shell 26 or to both at the junction between the bottom bracket shell 26 and the seat tube 16. The connections between the down tube 22 and rear-facing 72 and forward-facing 82 stems are discussed in more detail below.

Figures 9A, 9B, 10:
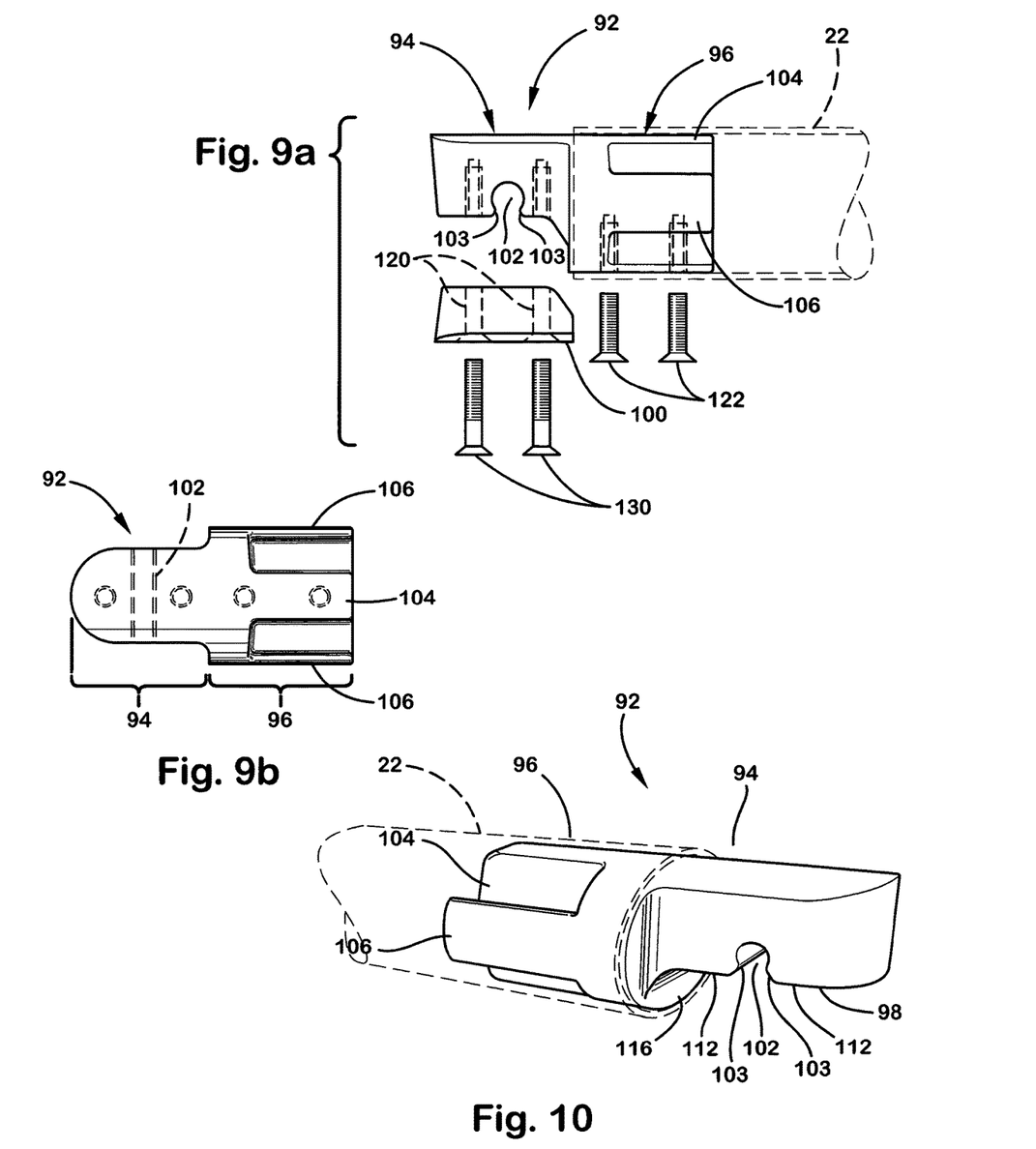
FIG. 9a is a side view of the top and bottom clip sections, showing the fasteners for connecting the sections.
FIG. 9b is a top view of the top clip section of the present invention.
FIG. 10 is a side perspective view of the top clip section shown in FIG. 9.

The connector attached to each end of the down tube 22 is a clip set 90. Each clip set 90 combines a top clip member 92 and a bottom clip member 100. As shown in isolation in FIGS. 9 and 10, each top clip member 92 includes a frame engagement section 94 and a tube engagement section 96. The bottom face 98 of the frame engagement section 94 of each top clip member 92 includes a rounded transverse groove or indentation 102.

Figure 7:
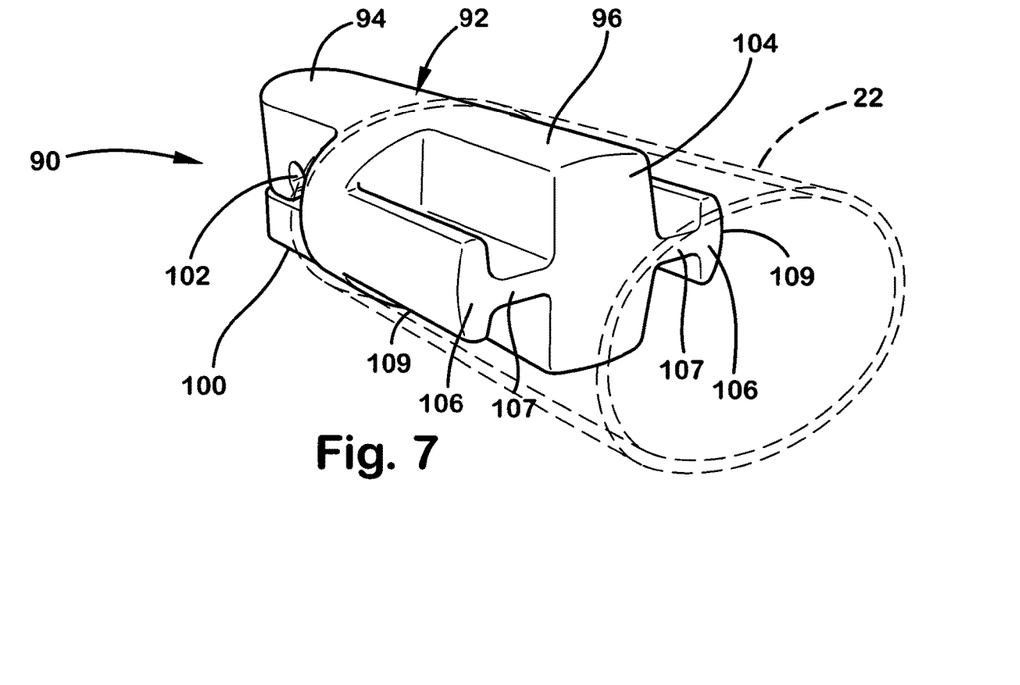
FIG. 7 is a side perspective view of a clip set showing a top clip section attached to a bottom clip section.

Preferably, the indentation 102 has an inwardly extending lip 103 on each side of the outer edge thereof, so that the clip can be resiliently clipped on a transverse mounting shaft on the frame (see FIG. 10). As is shown in FIG. 7, the tube engagement section 96 of each top clip member 92 has a cross shape, the cross shape comprising a large vertical rectangular prism 104 with "T"-shaped arms 106 extending from both sides of the middle of the prism portion 104. Arms 106 comprise outwardly extending legs 107 and vertical flanges 109 (FIG. 7 orientation). When the down tube is a leaf spring, the engagement section can be a flat end portion attached by fasteners to the front of the spring. The end portion alternatively can be a socket member that fits over the end of the spring and is fastened thereto by fasteners.

Figure 8:
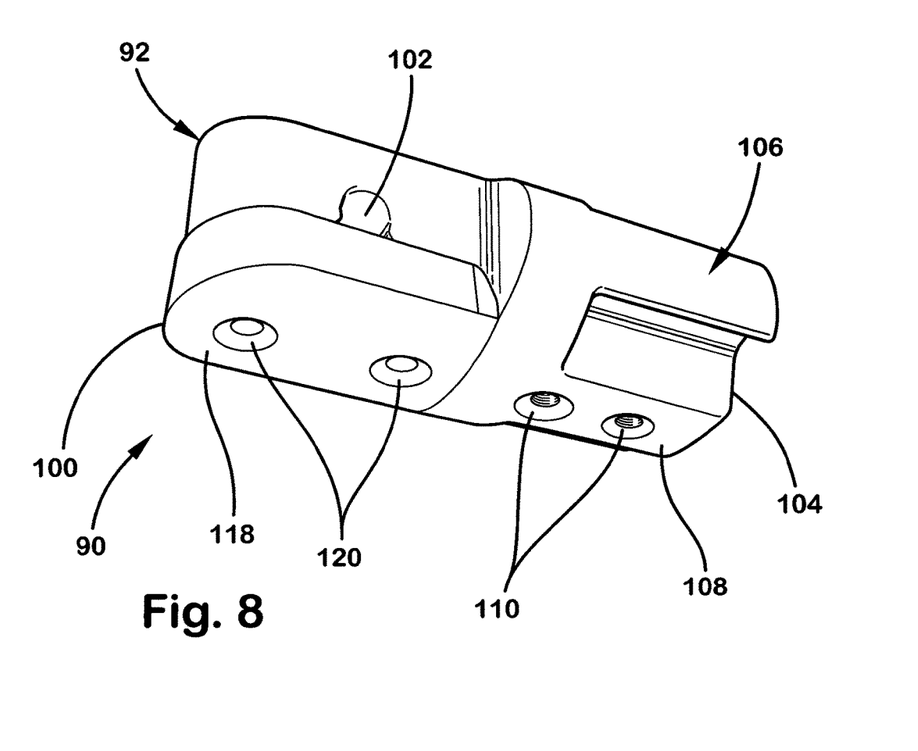
FIG. 8 is an inverted perspective view of the top and bottom clip sections shown in FIG. 7.

As shown in FIG. 8, each top clip member 92 preferably includes two main screw holes 110 aligned on the bottom face 108 of its tube engagement section 96 and two secondary screw holes 112 on the bottom face 98 of its shaft engagement section 94 that are in alignment with holes 120 in the bottom clip member 100 (see FIG. 8).

Figure 4:
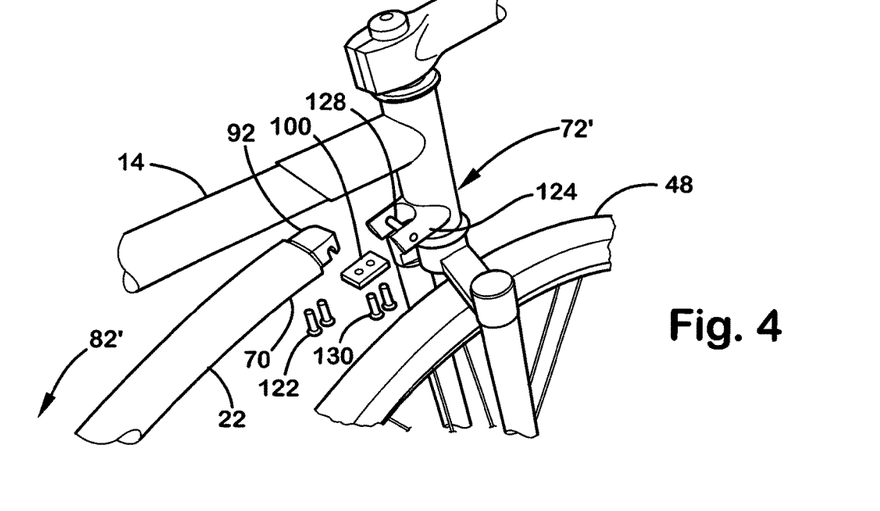
FIG. 4 is a perspective view of a bike frame showing the front section of the down tube disconnected from the frame.
Figure 6:
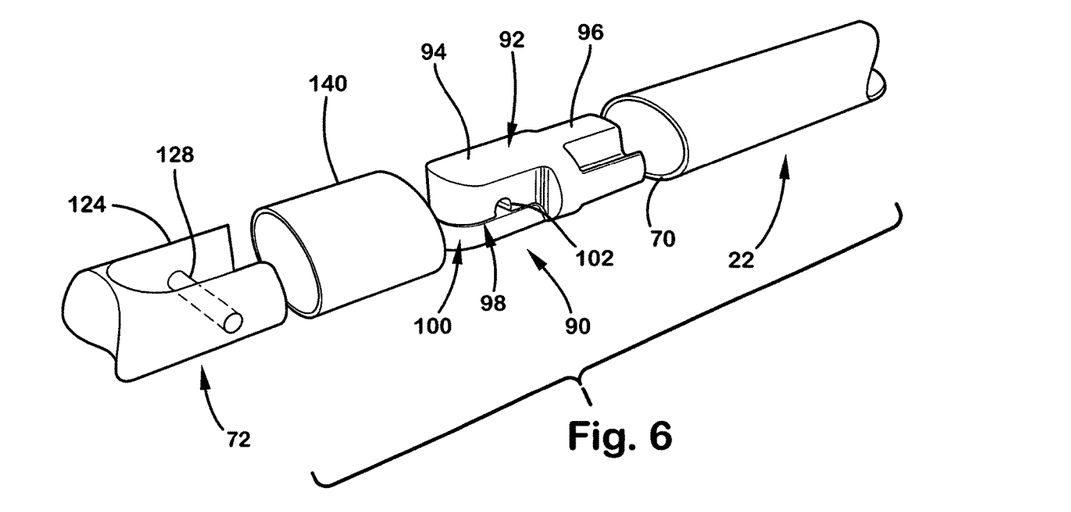
FIG. 6 is a partially-exploded perspective view of the front end of the down tube and clip set shown in FIG. 11 and showing an optional tube cover.

One embodiment of the bottom clip member 100 of each clip set 90 is shown in FIGS. 6-8. Each bottom clip member 100 has a width and a length that is roughly equivalent to the length and width of the shaft engagement section 94 of the corresponding top clip member 92. When placed beneath the shaft engagement section 94, a rear face of the bottom clip member 100 abuts a lateral face 116 of the tube engagement section 96 of the top clip member 92, as shown in FIG. 4. Also as shown in this figure, each bottom clip member 100 has two secondary screw holes 120 on its bottom face 118 that are aligned with corresponding holes in the top clips. The top and bottom clip members are screwed together through these openings.

Other embodiments of the clip sets are also contemplated. In another embodiment, each bottom clip member is significantly thinner relative to the corresponding top clip member, as compared to the relative thicknesses shown in the embodiments of FIGS.? and 8.

In still another embodiment, when the clip is to be affixed to a pivot pin that is easily removable, such as a clevis pin, it is not essential to make the clip in two separate parts so that the clip can be mounted on the pin while the pin is in place. Instead, the top clip and bottom clip members can be formed as single clip members, with a transverse bore hole formed through the clip. When this construction is employed, the end of the clip can be positioned between the flanges of the stem with the opening in the clip in alignment with the holes in the stem flanges. A mounting pin in the form of a clevis pin, bolt, or other removable pivot pin is inserted through the aligned openings and locked into place. Since with either type of clips, the clip member is formed of a resin with inherent lubricity, lubrication between the clips and the pivot pin is provided by the clip member and supplemental lubrication is not required. This embodiment can be used when the pivot pin is removable, however, the clip on nature of the foregoing embodiment has desirable features and may be employed even when the pivot pin is removable.

Figure 3:
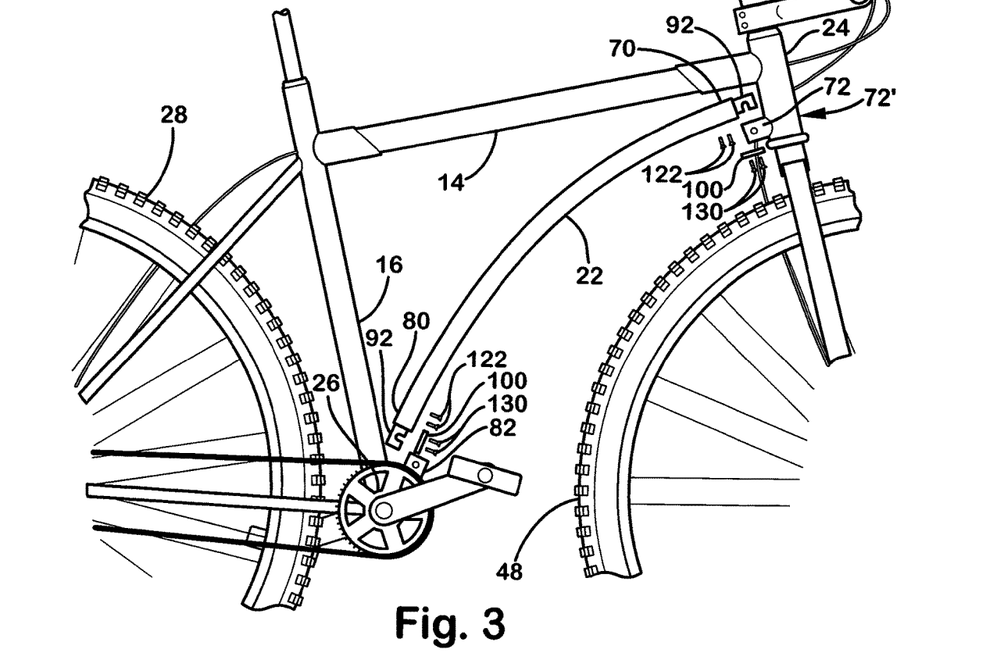
FIG. 3 is a side perspective view of the frame of FIG. 1 with the lower end of the down tube disconnected from the frame.
Figure 5:
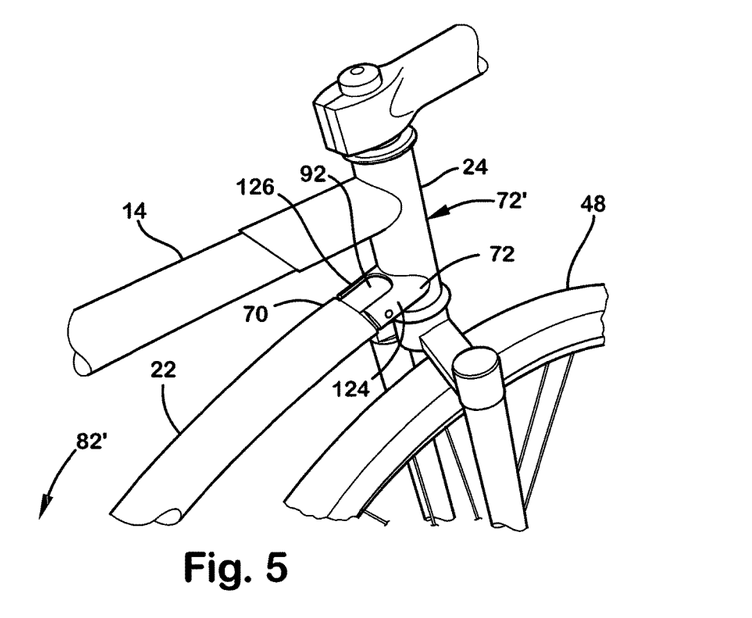
FIG. 5 is a perspective view similar to FIG. 4 but showing the front end of the down tube connected to the frame.

Referring to FIG. 3, the use of the two clip sets 90 is shown. One clip set 90 is used to connect the front end 70 of down tube 22 to rear-facing stem 72. To achieve this attachment, the tube engagement section 96 of the top clip member 92 is inserted into the front end 70 of the down tube 22 such that indentation 102 in the shaft engagement section 94 is oriented downwardly. Screws 122 are inserted through openings in the down tube and into screw holes 110. As shown in FIGS. 4 and 5, the indention 102 in the shaft engagement portion 94 of the top clip member 92 fits downwardly into a gap between a pair of spaced, opposed flanges 124, 126 on the rear-facing stem 72. The indentation 102 is fitted over a stainless steel lateral shaft or mounting pin 128 that extends between flanges 124 and 126. Pin 128 desirably is formed of stainless steel or other rust resistant material. Pin 128 can be press fit into the flanges of the stem. Alternatively, the pin can be a clevis pin or bolt, any of which is replaceable if necessary.

To complete the attachment of the front end 70 of the down tube 22 to the rear-facing stem 72, the bottom clip member 100 is positioned against the bottom face 108 of the top clip member 92, such that the lateral shaft 128 is captured between the top 92 and bottom 100 clip members, within the clip set 90. Two screws 130 are screwed through the screw holes 120 of the bottom clip member and into the aligned screw holes in the the top clip member, whereby the top 92 and bottom 100 clip members are securely attached together, locking the down tube on the bicycle frame.

As shown in FIG. 3, at the rear end 80 of the down tube 22, a near mirror image of the connection described above is employed to connect the rear end 80 of the down tube to the forward facing stem 82. Once both the top and bottom clips sets 90 are secured in their respective positions, the bicycle can be used by the rider.

Desirably, the clips members are formed of a synthetic resin such as super tough nylon, which has good inherent lubricant characteristics. This provides natural lubrication and obviates the need to lubricate the joints.

When desired by the rider, the down tube 22 can be removed and replaced in a simple manner by a replacement down tube 22A. Replacement down tubes of the present invention can have several different characteristics from the original down tubes. For example, the outer coloring scheme, flexibility, and degree of arc can all vary between down tubes, in order to change the flex characteristics or appearance of the down tube.

To change the down tubes, the original down tube 22 must first be removed. To achieve this, the steps described above are reversed, with the screws 122, 130 being unscrewed and the top 92 and bottom 100 clip members of the clip sets 90 being pulled apart and separated from the stems 72, 82. A replacement down tube 22A is then connected to the stems 72, 82 in the same manner as described above. If desired the clip sets for down tube 22 can be removed and reused in down tube 22A.

With the foregoing down tube assembly construction, down tube clip sets can easily be installed on and removed from down tubes. This makes it possible to replace the tubular portion of the down tube (which may be relatively inexpensive) without replacing possibly more expensive end connectors. It also makes it possible to replace end connectors without discarding the down tube.

In FIG. 6, an optional tube end cover 140, preferably formed of tubular plastic, is shown. Tube end covers 140 can be used to encircle and cover the connections between the down tube ends 70, 80 and the respective lateral shafts 128 of the stems 72, 82. The covers 140 cover pinch points, improve appearance and serve to protect the connections from undue wear potentially caused by unwanted dirt and other materials getting into these connection points.

The frame mounting stems employed for mounting the down tubes to the frame are shown in FIGS. 11-14. In one embodiment of the invention, different rear facing and forward facing stems 72 and 82 are employed. See FIGS. 11 and 12. Rear facing stem 72 (FIG. 11) is mounted on the rear side of head tube 24 at an upper portion of the frame and is connected to the clip member at the front end of the down tube, while forward facing stem 82 (FIG. 12) is mounted at the base of the seat tube on bottom bracket shell 26 and is connected to the clip member at the rear end of the down tube.

Figure 11A:
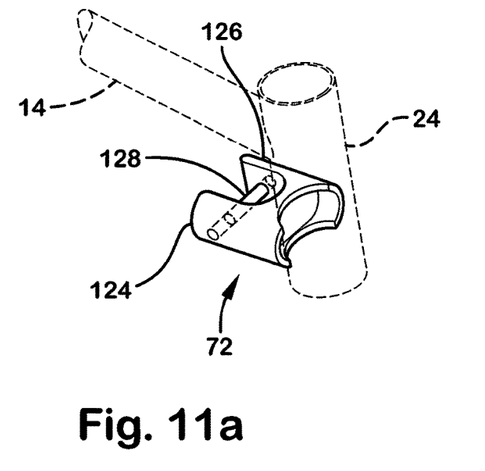
FIG. 11a is a perspective view of the front mounting stem attached to the bottom bracket shell shown in FIG. 1.
Figure 11B:
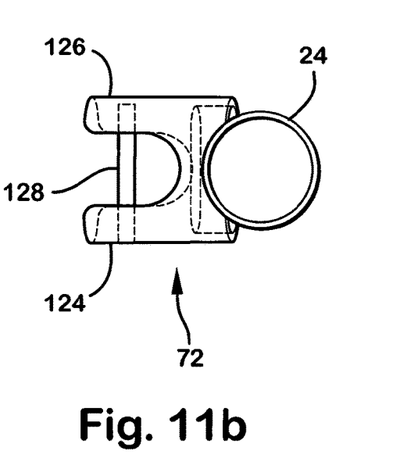
FIG. 11b is a top view of the mounting stem of FIG. 11.
Figure 12A:
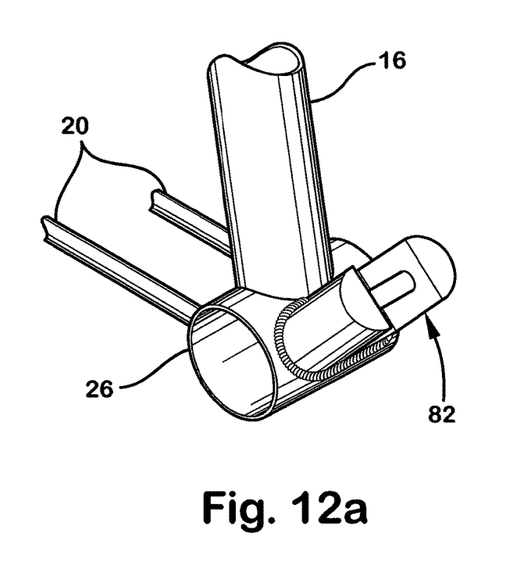
FIG. 12a is a perspective view of the rear mounting stem attached to the bottom bracket shell shown in FIG. 1.
Figure 12B:
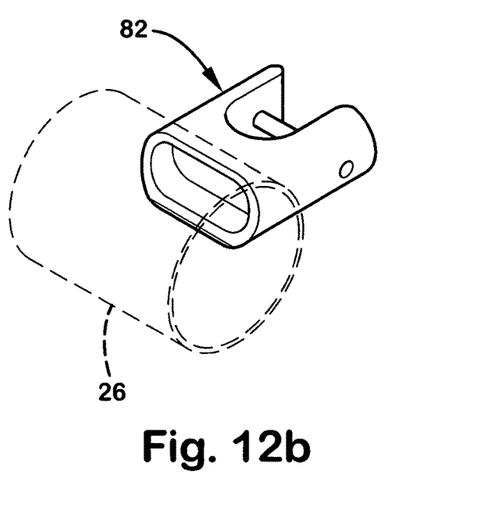
FIG. 12b is a perspective view of the mounting stem of FIG. 12a, showing the bottom bracket shell in phantom.
Figure 13A:
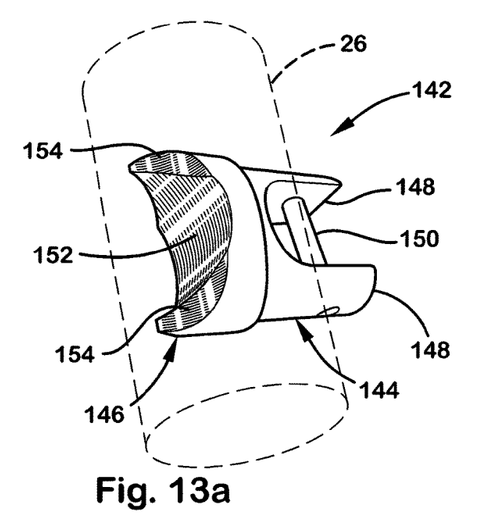
FIGS. 13a and 13b are a perspective view of a universal down tube mounting stem that connects to both the bottom bracket shell and head tube of the frame, showing the frame components in phantom.
Figure 13B:
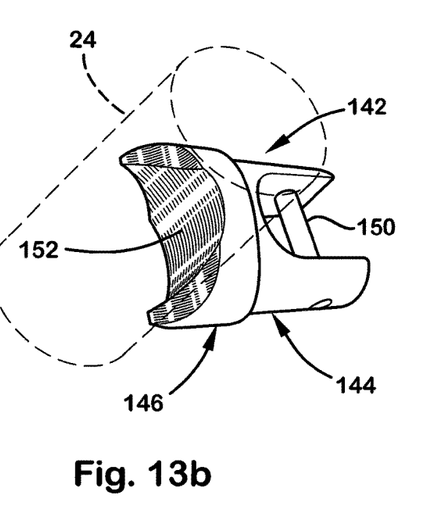
Figure 14:
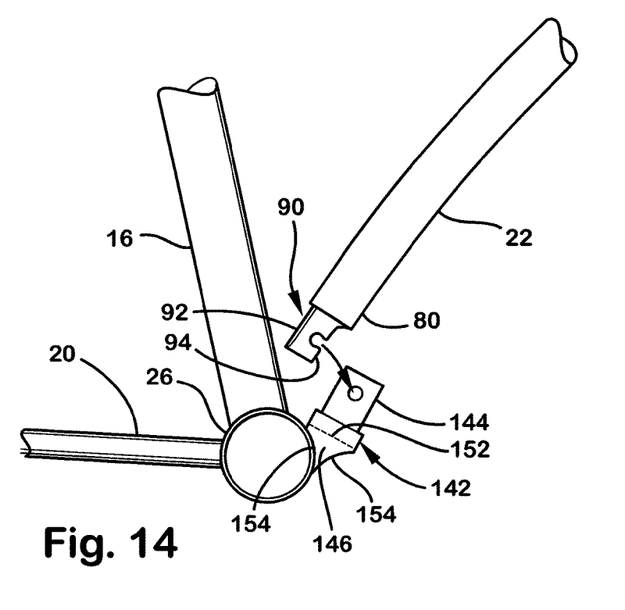
FIG. 14 is a fragmentary view showing a down tube connected to a frame using the universal mounting stem of FIG. 13.

Rear facing stem 72 is formed of aluminum or other suitable material. When the stem 72 and the bike frame are aluminum the stem typically is welded to the frame. When they are formed of a composite material the stems can be integrally molded into the frame. Stems that are welded to the frame are described herein.

Stem 72 includes a front end 73 that mates with and is attached to head tube 24. A vertically extending arcuate indentation or recess 75 in the front end of the stem mates with the head tube and is welded securely to the head tube. A rear end 77 of stem 72 comprises a pair of laterally spaced flanges 124 and 126, with a vertical slot 127 therebetween. The outer sides of the flanges have an oval outer contour that corresponds with the end of the down tube. The flanges have aligned pivot pin mounting holes 129 therein. A lateral shaft or mounting pin 128 is mounted in the openings 129 so as to extend across the slot.

It should be understood that the foregoing is merely an exemplary of the preferred practice of the present invention and that various modifications may be made in the arrangements and details of construction of the embodiments disclosed herein without departing from the spirit and scope of the present invention, as defined in the appended claims.

The invention claimed is:

1. A bicycle frame having a replaceable down tube assembly that is releasably mounted between forward and rearward mounting stems in the frame, the mounting stems including transverse mounting pins mounted therein and being secured to the frame at positions where ends of the down tube assembly are attached to the frame, the down tube assembly comprising an elongated down tube member having end fittings releasably attached to ends of the down tube member, the end fittings having transverse slots in lower ends thereof that fit over the mounting pins in the stems and the transverse slots and mounting pins being dimensioned to permit rotational movement therebetween, the end fittings further including a locking mechanism for releasably holding the end fittings on the mounting pins with the mounting pins extending through the transverse slots, an outer end of each end fitting includes an outwardly extending upper flange, the upper flange having the transverse slot formed in an underside thereof, and the locking mechanism comprising a locking plate that mounts on the underside of the upper flange below the mounting pin when the down tube member is mounted in the frame, the locking plate being releasably attached to the upper flange by releasable fasteners that hold the locking plate to the upper flange, and wherein the end fittings permit at least limited pivotal movement of the down tube member about a lateral axis of the mounting pins upon at least limited deflection of the down tube member between the forward and rearward mounting stems in the frame.

2. A bicycle frame according to claim 1 wherein the down tube member comprises an elongated tube having a resilient arcuate portion, the end fittings being mounted on the ends of the tube.

3. A bicycle frame according to claim 2 wherein the end fittings are formed from a synthetic resin having sufficient lubricity to permit pivotal movement of the end fittings on the pivot pins without requiring lubrication of the interface between the pivot pins and end fittings.

4. A bicycle frame according to claim 2 wherein at least one end fitting comprises an elongated body having an inner end that fits in the end of the tube and an outer end that protrudes outwardly from the end of the tube, the inner end being releasably attached to the end of the tube by releasable fasteners that extend through the side of the tube and into the inner end of the end fitting, the fasteners being releasable to permit replacement of the end fitting.

5. A bicycle frame according to claim 1 wherein the locking mechanism for locking the end fitting on the mounting pins comprises one or more inwardly extending projections at outer edges of the transverse slots, the inwardly extending projections closing the width of the slots at the outer edges to a distance less than the diameter of the mounting pins, the projections resiliently holding the mounting pins in the slots but being resiliently deflectable to permit the down tube member to be resiliently dipped on the locking pins in the mounts.

6. A bicycle frame according to claim 1 wherein the down tube member comprises an arcuate tube having a cross-section that is at least partially oval, with the down tube member having a major oval axis in a horizontal direction when the down tube member is mounted.

7. A bicycle frame according to claim 1 wherein the forward mounting stem is connected to a head tube of the frame and the forward mounting stem extends substantially rearwardly from the head tube, and the forward mounting stem has a front end that mates with the head tube of the frame, and a rear end of the forward mounting stem has a pair of spaced-apart rearward extending flanges between which the mounting pin is mounted; and the rearward mounting stem is connected to the frame at a bottom bracket shell and the rearward mounting stem extends substantially upwardly and forwardly from the bottom bracket shell, the rearward mounting stem has a rear end that mates with the bottom bracket shell, and a front end of the rearward mounting stem has a pair of laterally spaced-apart flanges between which the mounting pin is mounted.

8. A bicycle frame comprising:

a head tube;

a removable down tube;

a seat tube, the seat tube having an upper end and a lower end;

a top tube attached at a front end to the head tube and attached at a rear end to the seat tube;

a first stem, affixed to and rearwardly projecting from the head tube; the first stem rearwardly facing a first end portion with a first vertical gap therein defined by a first pair of laterally spaced opposed sides;

a first shaft affixed to the first stem by connection laterally between the first pair of opposed sides across the first vertical gap of the first end portion;

a first top clip having a first shaft engagement section and a first tube engagement section, the first shaft engagement section having a first downward-facing lateral indentation formed in a first bottom face of the first shaft engagement section such that the first shaft is removably insertable within the first indentation, the tube engagement section being formed such that it is insertable within an end of the removable down tube, and releasably securable therein by releasable fasteners;

a first bottom clip being releasably attachable by fasteners to the first bottom face to selectably retain the first shaft in rotational engagement between the first indentation and first bottom clip when the first bottom clip is attached to the first bottom face by said fasteners;

a bottom bracket shell fixedly attached to the lower end of the seat tube;

a second stem affixed to and forwardly projecting from the bottom bracket shell, the second stem having a second end portion with a second vertical gap defined by a second pair of laterally spaced sides;

a second shaft affixed to the second stem by connection laterally between the second pair of opposed sides across the second gap of the second end portion; and a second top clip having a second shaft engagement section and a second tube engagement section, the second tube engagement section being formed such that it is removably insertable within a second end of the down tube, the second shaft engagement section having a second downward-facing lateral indentation formed in a second bottom face of the second shaft engagement section;

a second bottom dip being releasably attachable by fasteners to the second bottom face to selectably retain the second shaft in rotational engagement between the second indentation and second bottom clip when the second bottom dip is attached to the second bottom face.

* * * * *